United States Patent Office 3,336,285
Patented Aug. 15, 1967

3,336,285
MONOAZO COMPOUNDS PREPARED FROM 3-AMINO-4-CYANOPYRAZOLE COMPOUNDS
Edmund B. Towne, William H. Moore, and Joseph B. Dickey, Kingsport, Tenn., assignors to Eastman Kodak Company, Rochester, N.Y., a corporation of New Jersey
No Drawing. Filed Mar. 23, 1964, Ser. No. 354,105
11 Claims. (Cl. 260—155)

This invention relates to new azo compounds prepared from 3-amino-4-cyanopyrazole compounds and their application to the art of dyeing or coloring.

This application is a continuation-in-part of our U.S. patent application Ser. No. 170,239, filed Jan. 31, 1962, now abandoned, and U.S. patent application Ser. No. 188,231, filed Apr. 17, 1962, now abandoned.

The new monoazo compounds of our invention have the formula:

I. 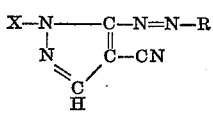

wherein X represents a member selected from the group consisting of a hydrogen atom, a lower alkyl radical having 1 to 4 carbon atoms and a benzene radical including phenyl and substituted phenyl, e.g., phenyl substituted with lower alkyl, lower alkoxy, nitro, or halogen, and R represents the residue of aniline coupling component, a tetrahydroquinolin-6-yl coupling component or a benzomorpholin-6-yl coupling component, the compounds being free of water-solubilizing groups such as sulfonic acid groups. They have good affinity for cellulose alkyl carboxylic acid ester, having 2 to 4 carbon atoms in the acid groups thereof, textile materials, nylon textile materials, polyester textile materials and acrylonitrile polymer textile materials and yield dyeings thereon ranging in shade from orange to bluish-violet. The dyeings obtained have excellent fastness to sublimation, good to excellent fastness to gas and washing and fair fastness to light.

The new monoazo compounds of our invention are water-insoluble. They are applied to the aforesaid textile materials by known dyeing techniques. Being water-insoluble they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Unless otherwise indicated, the term "acrylonitrile polymer" as used herein includes polymers consisting essentially of polymerized acrylonitrile (i.e., acrylonitrile polymers containing at least 85% by weight of acrylonitrile) as well as modified acrylonitrile polymers known in the art as modacrylics. The modacrylics contain at least 40% but less than 85% acrylonitrile by weight. The modacrylic fibers disclosed in U.S. Patents 2,811,409, 2,831,826 and 2,843,572, for example, can be dyed with our new monoazo compounds.

The acrylonitrile polymer fibers sold under the trademarks "Verel" and "Orlon" in the form of filaments, yarn and fabric, for example, are illustrative of the acrylonitrile polymer textile materials that can be dyed with our new monoazo compounds.

The new monoazo compounds of our invention are prepared by diazotizing a 3-amino-4-cyanopyrazole compound having the formula:

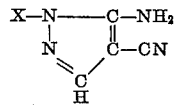

wherein X represents a hydrogen atom or radical abovementioned and coupling the diazonium compound obtained with one of the mentioned coupling components.

While our invention relates broadly to the new azo compounds having the formula number I, it relates particularly to the azo compounds having formula.

II. 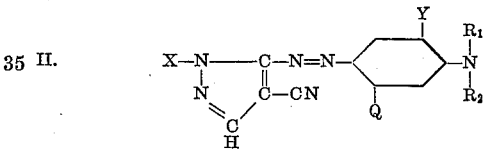

wherein X has the meaning previously assigned to it, $R_1$ and $R_2$ each represents an alkyl radical having 1 to 4 carbon atoms, a hydroxy-alkyl group having 2 to 4 carbon atoms, an alkoxyalkyl group having 3 to 4 carbon atoms, a cyanoalkyl group having 3 to 5 carbon atoms, an acetoxyalkyl group having 4 to 6 carbon atoms, a carbomethoxymethyl group, a carboethoxymethyl group, a β-carbomethoxyethyl group, a β-carboethoxyethyl group, a haloalkyl group having 2 to 4 carbon atoms, e.g., a 2-bromoethyl group, a 2-chloroethyl, a 2,2-difluoroethyl group, a 2,2-difluoro-n-propyl group, a 3,3-difluoropropyl group, a 3,3-difluoro-n-butyl, a 2,2,2-trifluoroethyl, a 3,3,3-trifluoropropyl group, a 4,4,4-trifluorobutyl group, an alkenyl group having 3 to 4 carbon atoms, a chloroalkenyl group having 3 to 4 carbon atoms, a bromoalkenyl group having 3 to 4 carbon atoms, a 2,3-epoxypropyl group, a

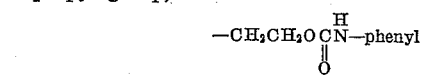

group, a

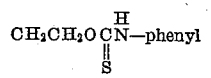

group, a

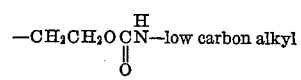

group or a

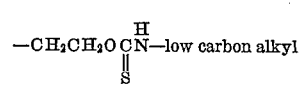

Q represents a hydrogen atom, a bromine atom, a chlorine atom, a methyl group, an ethyl group, a methoxy group, an ethoxy group, an acetylamino group, an n-propionylamino group or an n-butyrylamino group, and Y represents a hydrogen atom, a methyl group, an ethyl group, a methoxy group, an ethoxy group, a chlorine atom and a bromine atom.

3-amino - 4-cyanopyrazole, 2-phenyl - 3-amino-4-cyanopyrazole, 2-(4'-nitrophenyl)-3-amino - 4-cyanopyrazole, 2-(2'4'-dinitrophenyl)-3-amino - 4-cyanopyrazole, 2-(4'-methylphenyl) - 3-amino - 4-cyanopyrazole, 2-(4'-methoxyphenyl) - 3-amino - 4-cyanopyrazole, 2-(4'-ethoxyphenyl)-3-amino - 4-cyanopyrazole, 2-(2'-chlorophenyl)-3-amino - 4-cyanopyrazole, 2-(4'-chlorophenyl)-3-amino-4-cyanopyrazole, 2-(2',5'-dichlorophenyl) - 3-amino-4-cyanopyrazole, 2-(2'-bromophenyl) - 3-amino - 4-cyanopyrazole, 2-(4'-bromophenyl) - 3-amino-4-cyanopyrazole, 2-methyl - 3-amino - 4-cyanopyrazole, 2-ethyl - 3-amino-4-cyanopyrazole, 2-n-propyl - 3-amino - 4-cyanopyrazole, 2-isopropyl - 3-amino - 4-cyanopyrazole and 2-n-butyl-3-amino-4-cyanopyrazole are illustrative of the 3-amino-4-cyanopyrazole compounds used in preparing the azo compounds of our invention.

Illustrative of the alkyl groups represented by $R_1$ and $R_2$ are the methyl, the ethyl, the n-propyl, the isopropyl and the n-butyl groups. Similarly, the β-hydroxyethyl, the β-hydroxypropyl, the γ-hydroxypropyl, the β,γ-dihydroxypropyl, the β-methyl-β,γ-dihydroxypropyl and the α-hydroxybutyl groups are illustrative of the hydroxyalkyl groups $R_1$ and $R_2$ represent. Illustrative of the alkoxyalkyl groups represented by $R_1$ and $R_2$ are the β-methoxyethyl and the β-ethoxyethyl groups. Similarly, the β-cyanoethyl, the γ-cyanopropyl and the δ-cyanobutyl group are illustrative of the cyanoalkyl groups $R_1$ and $R_2$ represent.

Allyl, propenyl, isopropenyl, 1-butenyl, 2-butenyl and 3-butenyl are illustrative of the alkenyl groups represented by $R_2$. Chloroallyl (—CH$_2$CH—CHCl), bromoallyl (—CH$_2$CH—CHBr), 3-chloro-3-butenyl (—CH$_2$CH$_2$CH—CHCl)

and 3-bromo-3-butenyl are illustrative of halogenated alkanyl groups. Illustrative of the $$-CH_2CH_2O\underset{\underset{O}{\|}}{C}\underset{}{\overset{H}{N}}-$$

low carbon alkyl groups are $$-CH_2CH_2O\underset{\underset{O}{\|}}{C}\overset{H}{N}CH_3,\ -CH_2CH_2O\underset{\underset{O}{\|}}{C}\overset{H}{N}C_2H_5,\ -CH_2CH_2O\underset{\underset{O}{\|}}{C}\overset{H}{N}C_3H_7(n)$$

and $$-CH_2CH_2O\underset{\underset{O}{\|}}{C}\overset{H}{N}C_4H_9(n)$$

for example. Illustrative of the $$-CH_2CH_2O\underset{\underset{S}{\|}}{C}\overset{H}{N}-\text{low carbon alkyl}$$

groups are $$-CH_2CH_2O\underset{\underset{S}{\|}}{C}\overset{H}{N}CH_3,\ -CH_2CH_2O\underset{\underset{S}{\|}}{C}\overset{H}{N}C_2H_5,\ -CH_2CH_2O\underset{\underset{S}{\|}}{C}\overset{H}{N}C_3H_7(n)$$

and $$-CH_2CH_2O\underset{\underset{S}{\|}}{C}\overset{H}{N}C_4H_9(n)$$

for example.

Typical of the aniline coupling components used in the preparation of the azo compounds of our invention are
aniline,
m-toluidine,
m-anisidine,
m-chloroaniline,
2-methoxy-5-chloroaniline,
2,5-dimethoxyaniline,
2-methoxy-5-methylaniline,
N-β-hydroxyethylaniline,
N-β-hydroxypropylaniline,
N-β,γ-dihydroxypropylaniline,
N-γ-hydroxypropylaniline,
N-δ-hydroxybutylaniline,
N-β-hydroxyethyl-o-chloroaniline,
N-β-hydroxyethyl-o-methoxyaniline,
N-β-cyanoethylaniline,
N-β-methoxyethylaniline,
N-β-ethoxyethylaniline,
N-β-carbomethoxyethyl-m-toluidine,
N-β-carboethoxyethyl-m-chloroaniline,
N,N-di-β-hydroxyethylaniline,
N,N-di-β-hydroxyethyl-m-chloroaniline,
N,N-di-β-hydroxyethyl-m-toluidine,
N-ethyl-N-β,γ-dihydroxypropyl-m-toluidine,
N-ethyl-N-(β-methyl-β,γ-dihydroxypropyl)aniline,
N-butyl-N-(β-sodium sulfatoethyl)-m-toluidine,
N-β-cyanoethyl-N-(β-sodium phosphatoethyl)-m-chloroaniline,
N-methyl-N-β,γ-dihydroxypropyl-m-toluidine,
N-β-methoxyethyl-N-β,γ-dihydroxypropyl-m-toluidine,
N,N-di-β-hydroxyethyl-m-bromoaniline,
N-ethyl-N-δ-hydroxybutylaniline,
N-β-hydroxyethyl-N-β,β,β-trifluoroethylaniline,
N-β-hydroxyethyl-N-γ,γ,γ-trifluoropropylaniline,
N-β-hydroxyethyl-N-δ,δ,δ-trifluorobutylaniline,
N-β-hydroxyethyl-N-β,β-difluoroethylaniline,
N-β-hydroxypropyl-N-γ,γ-difluoropropylaniline,
N-β-hydroxyethyl-N-β,β-difluoropropylaniline,
N-β,γ-dihydroxypropyl-N-γ,γ-difluorobutylaniline,
N-β,γ-dihydroxypropyl-N-δ,δ-difluoroamylaniline,
N-methyl-N-β-hydroxyethyl-m-bromoaniline,
N,N-di-β-hydroxyethyl-2,5-diethoxyaniline,
N,N-di-β-hydroxyethyl-2,5-dichloroaniline,
N-n-propyl-N-β-hydroxyethylaniline,
N-isopropyl-N-β-hydroxyethylaniline,
N-n-butyl-N-β-hydroxyethylaniline,
N-β-hydroxyethyl-N-cyanoethyl-m-chloroaniline,
N-β-hydroxyethyl-N-γ-cyanopropylaniline,
N-β-carbomethoxyethylaniline,
N-β-carboethoxyethyl-N-β-hydroxyethylaniline,
N-β-carbomethoxyethyl-N-β-hydroxyethyl-m-chloroaniline,
N-β-hydroxyethyl-N-β-chloroallylaniline,
N-β-hydroxyethyl-N-β-nitroethylaniline,
N-methyl-N-β-chloroethylaniline,
N-ethyl-N-β-chloroethylaniline,
N-ethyl-N-β-chloroethyl-m-chloroaniline,
N-β-hydroxyethyl-N-β-chloroethylaniline,
N-ethyl-N-β-bromoethylaniline,
N-ethyl-N-β-bromoethyl-m-anisidine,

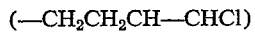
N-ethyl-N—CH$_2$CH$_2$O$\underset{\underset{O}{\|}}{C}\overset{H}{N}$-phenyl-aniline

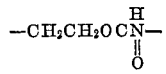
N-ethyl-N—CH$_2$CH$_2$O$\underset{\underset{O}{\|}}{C}\overset{H}{N}$-phenyl-m-chloroaniline

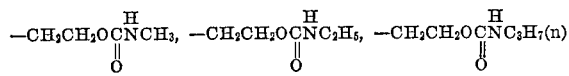
N-β-hydroxyethyl-N—CH$_2$CH$_2$O$\underset{\underset{O}{\|}}{C}\overset{H}{N}$CH$_3$-aniline

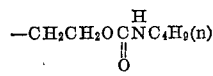
N-ethyl-N—CH$_2$CH$_2$O$\underset{\underset{O}{\|}}{C}\overset{H}{N}$C$_2$H$_5$-m-toluidine

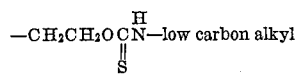
N-ethyl-N—CH$_2$CH$_2$O$\underset{\underset{S}{\|}}{C}\overset{H}{N}$C$_2$H$_5$-aniline

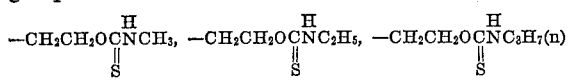
N-ethyl-N—CH$_2$CH$_2$O$\underset{\underset{S}{\|}}{C}\overset{H}{N}$CH$_3$-2,5-dimethoxyaniline

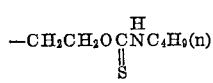

N-methyl-N-(2,3-epoxypropyl)aniline,
N-ethyl-N-(2,3-epoxypropyl)aniline,
N,N-di-(2,3-epoxypropyl)aniline,
N,N-di-(β-chloroethyl)aniline,
N,N-di-(β-bromoethyl)aniline,
N-ethyl-N-(γ-chloro-β-hydroxypropyl)aniline,
N,N-di-(γ-bromo-β-hydroxypropyl)aniline and
N-β-methoxyethyl-N-(γ-chloro-β-hydroxypropyl)aniline.

Formula I wherein R is a tetrahydroquinolin-6-yl or benzomorpholin-6-yl coupling component residue contemplates compounds of Formulas III and IV as follows:

(III)

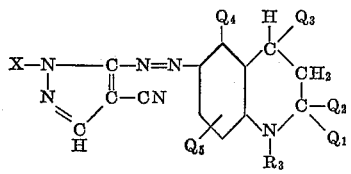

and (IV)

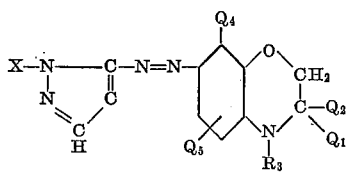

wherein $R_3$ represents a hydroxylalkyl group having 2 to 4 carbon atoms, an alkyl group having 1 to 4 carbon atoms, an alkoxyalkyl group having 3 to 4 carbon atoms, a 2-carbomethoxyethyl group, a 2-carboethoxyethyl group, a haloalkyl group having 2 to 4 carbon atoms, e.g. 2,2-difluoroethyl, 2,2,2-trifluoroethyl, 3,3-difluoropropyl, 3,3,3-trifluoropropyl, 4,4-difluorobutyl, 4,4,4-trifluorobutyl, chloroethyl, 2-hydroxy-3-chloropropyl, allyl, or a cyanoalkyl group having 3 to 5 carbon atoms, $Q_1$, $Q_2$ and $Q_5$ each represents a hydrogen atom, a methyl group or an ethyl group, $Q_4$ and $Q_5$ each represents a hydrogen atom, a methyl group, a methoxy group, an ethoxy group, a chlorine atom, a bromine atom, a fluorine atom, an acetylamino group, a propionylamino group, or a butyrylamino group, and X is as described above.

Illustrative of the alkyl groups represented by $R_3$ are the methyl, the ethyl, the n-propyl, the isopropyl and the n-butyl groups. Similarly, the β-hydroxyethyl, the β-hydroxypropyl, the γ-hydroxypropyl, the β,γ-dihydroxypropyl, the β-methyl-β,γ-dihydroxypropyl and the δ-hydroxybutyl groups are illustrative of the hydroxyalkyl groups $R_3$ represents.

Illustrative of the alkoxyalkyl groups represented by $R_3$ are the β-methoxyethyl, and the β-ethoxyethyl groups. Similarly, the β-cyanoethyl, the γ-cyanopropyl and the δ-cyanobutyl groups are illustrative of the cyanoalkyl groups $R_3$ represents.

The term "tetrahydroquinoline" as used herein and in the claims refers to 1,2,3,4-tetrahydroquinoline.

3-amino-4-cyanopyrazole is a known compound. It is described and claimed by U.S. Patent 2,759,949, issued Aug. 21, 1956.

The 3-amino-4-cyanopyrazole compounds used in preparing the azo compounds of our invention can be prepared by reacting a hydrazine compound having the formula:

wherein X has the meaning previously assigned to it, with ethoxymethylenemalononitrile. This method of preparation is illustrated hereinafter as well as in U.S. Patent 2,759,949.

The following examples illustrate our invention. Parts are expressed as parts by weight.

EXAMPLE 1.—PREPARATION OF 3-AMINO-4-CYANOPYRAZOLE 20 parts of ethoxymethylenemalononitrile were carefully mixed with 5.5 parts of 95% hydrazine with ice cooling. When the vigorous reaction had subsided 50 parts of absolute ethyl alcohol were added and the resulting mixture was refluxed for 17–18 hours. The reaction mixture was then evaporated to dryness under a vacuum of about 500 mm. The residue was extracted with cold absolute ethyl alcohol and dried. 11.3 parts of crude 3-amino-4-cyanopyrazole was thus obtained. Upon crystallization from 200 parts of water using charcoal 7.24 parts (42%) of purified 3-amino-4-cyanopyrazole having a melting point of 166 to 169° C. were obtained.

EXAMPLE 2.—PREPARATION OF 2-PHENYL-3-AMINO-4-CYANOPYRAZOLE 20 parts of ethoxymethylenemalononitrile were mixed with 17.5 parts of phenyl hydrazine with ice cooling. When the vigorous reaction had subsided 50 parts of anhydrous ethyl alcohol were added and the reaction mixture resulting was refluxed for 20 hours. Upon working up the reaction mixture as described in Example 1, 21.2 parts of 2-phenyl-3-amino-4-cyanopyrazole were obtained as a tan solid. Upon crystallization from 1000 parts of hot water with the aid of charcoal 16.1 parts of purified 2-phenyl-3-amino-4-cyanopyrazole melting at 136–138° C. (55%) were obtained.

Calculated for 2-phenyl-3-amino-4-cyanopyrazole: C=65.22, H=4.35, N=30.43. Found: C=65.03, H=4.44, N=30.53.

EXAMPLE 3.—PREPARATION OF 2-METHYL-3-AMINO-4-CYANOPYRAZOLE

Operating exactly as described in Example 2, 20 parts of ethoxymethylenemalononitrile were reacted with 23 parts of methyl hydrazine sulfate solid in 50 parts of anhydrous ethanol to obtain 23 parts (65%) of 2-methyl-3-amino-4-cyanopyrazole melting at 120–124° C. Upon crystallaization from 1000 parts of hot water with the aid of charcoal purified 2-methyl-3-amino-4-cyanopyrazole melting at 125—126° C. was obtained.

EXAMPLE 4.—PREPARATION OF 2-(4'-NITROPHENYL)-3-AMINO-4-CYANOPYRAZOLE 20 parts of ethoxymethylenemalononitrile and 24.5 parts of p-nitrophenyl hydrazine in 100 parts of anhydrous ethyl alcohol were refluxed, with stirring, for about 15 minutes. A red solution was thus obtained. After 15 minutes additional stirring a thick solid precipitated which prevented stirring even when additional anhydrous ethyl alcohol was added. The precipitate was recovered by filtration, washed with anhydrous alcohol and dried. 21 parts of 2-(4'-nitrophenyl)-3-amino-4-cyanopyrazole were obtained as yellow crystals melting at 217–220° C. Upon crystallization from methyl alcohol with the aid of charcoal 10.6 parts (29%) of 2-(4'-nitrophenyl)-3-amino-4-cyanopyrazole melting at 220–222° C. were obtained.

Calculated for 2-(4'-nitrophenyl)-3-amino-4-cyanopyrazole: C=52.40, H=3.06, O=13.96. Found: C=52.27, H=3.17, O=13.92.

The other 3-amino-4-cyanopyrazole compounds used in the preparation of the azo compounds of our invention can be similarly prepared following the general procedure set forth in Examples 1, 2, 3 and 4.

EXAMPLE 5

A. *Diazotization*

Nitrosylsulfuric acid was prepared by adding 0.76 part of sodium nitrite portionwise to 9.2 parts of concentrated sulfuric acid (specific gravity 1.83), with stirring, and allowing the temperature to rise to 65° C. The resulting solution was then cooled to 5° C. and 10.5 parts of a mixture of 1.5 parts of propionic acid and 9 parts of acetic acid were added dropwise, with stirring, while allowing the temperature to rise to 15° C. The reaction mixture was ano-pyrazole were added portionwise, with stirring, after ano-pyrazole were added portionwise, with stirring, after which 10.5 parts more of the propionic-acetic acid mixture were added, keeping the temperature at 0° C.–5° C. The reaction mixture was then stirred at 0° C.–5° C. for two hours and the excess sodium nitrite present was destroyed by adding 0.5 part of urea.

B. Coupling

To a solution of 0.52 part of N-ethyl-N-2,3-dihydroxypropyl-m-toluidine in 6.3 parts of the propionic-acetic acid mixture cooled to 0° C., were added, with stirring, one-fourth of the 3-amino-4-cyanopyrazole diazonium solution prepared as described in A at such a rate that the temperature remained at 0° C.–5° C. When the addition was completed the reaction mixture was made neutral to Congo Red paper by the addition of solid, anhydrous sodium acetate. The neutralized coupling mixture was allowed to stand in a melting ice bath for one hour, with occasional stirring, and then was diluted with 250 parts of cold water, with good stirring. The dye compound which precipitated was recovered by filtration, washed with water until neutral and air-dried. 0.58 part (71%) of the dye compound was thus obtained. It dyes cellulose acetate and nylon fabrics deep bright yellow-orange shades and polyester and acrylic fibers duller orange shades.

EXAMPLE 6

A solution of 0.67 part of N,N-di-β-hydroxyethyl-2-methoxy-5-acetylaminoaniline in 6.3 parts of the propionic-acetic acid mixture prepared as described in Example 5A was coupled with one-fourth of the 3-amino-4-cyanopyrazole diazonium solution obtained as described in Example 5A. Coupling and recovery of the dye compound formed were carried out in accordance with the procedure described in Example 5B. 0.71 part (73%) of dry dye compound was obtained. It dyes cellulose acetate, nylon and polyester textile materials bright red-pink shades which have good fastness to light. Acrylic fibers are dyed a generally similar shade having good light fastness.

EXAMPLE 7

1.84 parts of 2-phenyl-3-amino-4-cyanopyrazole were diazotized and the diazonium compound obtained was coupled with 2.46 parts of N-β-cyanoethyl-N-β-acetoxyethyl-m-toluidine. Diazotization, coupling and recovery of the dye compound formed were carried out in accordance with the general procedure described in Example 5. The dye compound obtained dyes cellulose acetate, nylon, polyesters, such as Kodel and Dacron, and acrylonitrile polymers, such as Verel and Orlon, orange-red shades having the fastness properties indicated hereinbefore.

EXAMPLE 8

2.29 parts of 2-(4'-nitrophenyl)-3-amino-4-cyanopyrazole were diazotized and the diazonium compound obtained was coupled with 2.16 parts of N,N-di-β-hydroxyethyl-m-chloroaniline. Diazotization, coupling and recovery of the dye compound formed were carried out in accordance with the general procedure described in Example 5. The dye compound obtained dyes cellulose acetate, nylon, polyester and acrylonitrile polymer textile materials reddish-violet shades having the fastness properties indicated hereinbefore.

EXAMPLE 9

1.22 parts of 2-methyl-3-amino-4-cyanopyrazole were diazotized and the diazonium compound obtained was coupled with 3.2 parts of

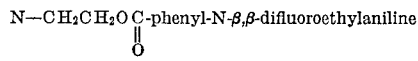

Diazotization, coupling and recovery of the dye compound formed were carried out in accordance with the general procedure described in Example 5. The dye compound obtained dyes cellulose acetate, nylon, polyester and acrylonitrile polymer textile materials orange shades having the fastness properties indicated hereinbefore.

EXAMPLE 10

Example 5B was repeated using 0.44 part of N-ethyl-N-2,3-dihydroxypropylaniline in place of N-ethyl-N-2,3-dihydroxypropyl-m-toluidine. The dye compound obtained dyes cellulose acetate, nylon, polyester and acrylonitrile polymer textile materials yellow shades having the fastness properties indicated hereinbefore.

EXAMPLE 11

Example 5B was repeated using 0.54 part of N,N-di-β-hydroxyethyl-m-chloroaniline in place of N-ethyl-N-2,3-dihydroxypropyl-m-toluidine. 0.53 part (51%) of dye was obtained. It dyes cellulose acetate, polyester and acrylonitrile polymer textile materials reddish-pink shades and nylon textile materials russet-red shades. The dyeings have the fastness properties indicated hereinbefore.

Following the procedure described in Examples 1 to 11, inclusive, the dye compounds indicated hereinafter are prepared. The color stated is that which the dyes give on cellulose acetate textile materials. Nylon, polyester and acrylonitrile polymer textile materials are dyed the same or generally similar colors as the cellulose acetate textile materials.

| Diazonium Component | Coupling Component | Color |
|---|---|---|
| 3-amino-4-cyanopyrazole | Aniline | Yellow. |
| Do | m-Toluidine | Do. |
| Do | 2,5-dimethoxyaniline | Orange-yellow. |
| Do | N-β-hydroxyethylaniline | Do. |
| Do | N-δ-hydroxybutylaniline | Orange. |
| Do | N-ethyl-N-β-ethoxyethylaniline | Do. |
| Do | N,N-di-β-hydroxyethylaniline | Yellow-orange. |
| Do | N,N-di-β-hydroxyethyl-m-bromoaniline | Yellow. |
| Do | N-n-butyl-N-β-hydroxyethylaniline | Yellow-orange. |
| Do | N-β-carbomethoxyethylaniline | Yellow. |
| Do | N-β-carboethoxyethyl-N-β-hydroxyethylaniline | Do. |
| Do | N-β-hydroxyethyl-N-β,β-difluoroethylaniline | Do. |
| Do | N-β-hydroxyethyl-N-β,β,β-trifluoroethylaniline | Do. |
| Do | N—CH$_2$CH$_2$OC(=O)N(H)C$_2$H$_5$—N-ethylaniline | Orange-yellow. |
| Do | N—CH$_2$CH$_2$OC(=O)N(H)C$_2$H$_5$—N-β-hydroxyethylaniline | Do. |

| Diazonium Component | Coupling Component | Color |
|---|---|---|
| 3-amino-4-cyanopyrazole | N—CH₂CH₂O$\overset{\text{O}}{\overset{\|}{\text{C}}}$NC₂H₅-aniline (with H on N) | Yellow. |
| Do | N—CH₂CH₂O$\overset{\text{S}}{\overset{\|}{\text{C}}}$NCH₃-aniline (with H on N) | Do. |
| Do | N—CH₂CH₂O$\overset{\text{S}}{\overset{\|}{\text{C}}}$NC₂H₅—N—ethylaniline (with H on N) | Orange-yellow. |
| Do | N-ethyl-N-(2,3-epoxypropyl)aniline | Orange. |
| Do | N,N-di-(2,3-epoxypropyl)aniline | Do. |
| Do | N-allyl-N-β-hydroxyethylaniline | Orange-yellow. |
| Do | N-chloroallyl-N-β-hydroxyethylaniline | Yellow. |
| Do | N-bromallyl-N-ethylaniline | Do. |
| Do | N-3-butenyl-N-ethylaniline | Do. |
| Do | N-(3-chloro-3-butenyl)-N-β-hydroxyethylaniline | Orange-yellow. |
| Do | N,N-di-β-hydroxyethyl-m-chloroaniline | Do. |
| Do | N,N-di-β-hydroxyethyl-m-toluidine | Yellow-orange. |
| Do | N-β-hydroxyethyl-N-β-methoxyethylaniline | Do. |
| Do | N-β-cyanoethyl-N-β-hydroxyethylaniline | Yellow. |
| Do | N-β-cyanothetyl-N-ethyl-m-toluidine | Do. |
| Do | N-β-hydroxyethyl-N-β-difluoroethyl-m-toluidine | Do. |
| Do | N-2-methyl-2,3-dihydroxypropylaniline | Orange. |
| 2-phenyl-3-amino-4-cyanopyrazole | N-ethyl-N-β-hydroxyethylaniline | Red. |
| Do | N,N-di-β-hydroxyethylaniline | Red. |
| Do | N-methyl-N-β-hydroxypropylaniline | Red. |
| Do | N-ethyl-N-γ-hydroxypropylaniline | Red. |
| Do | N-δ-hydroxybutylaniline | Orange-red. |
| Do | N-ethyl-N-2,3-dihydroxypropyl-m-toluidine | Violet-red. |
| Do | N,N-di-β-hydroxyethyl-2-methoxy-5-acetylaminoaniline | Violet. |
| Do | N,N-di-β-hydroxyethyl-m-toluidine | Red. |
| Do | N-β-hydroxyethyl-N-β-methoxyethylaniline | Red. |
| Do | N-β-cyanoethyl-N-β-hydroxyethylaniline | Orange-red. |
| Do | N-β-cyanoethyl-N-ethyl-m-toluidine | Do. |
| Do | N-2-methyl-2,3-dihydroxypropylaniline | Red. |
| Do | N-β-hydroxyethyl-N-β-difluoroethyl-m-toluidine | Orange-red. |
| 2-(4'-nitrophenyl)-3-amino-4-cyanopyrazole | N-ethyl-N-β-hydroxyethylaniline | Violet. |
| Do | N-ethyl-N-β-cyanoethylaniline | Reddish-violet. |
| Do | N-β-acetoxyethyl-N-β-cyanoethylaniline | Violet-red. |
| Do | N,N-di-β-hydroxyethyl-m-chloroaniline | Do. |
| Do | N-ethyl-N-2,3-dihydroxypropyl-m-toluidine | Violet. |
| Do | N,N-di-β-hydroxyethyl-2-methoxy-5-acetylaminoaniline | Blue-violet. |
| Do | N,N-di-β-hydroxyethyl-m-chloroaniline | Red-violet. |
| Do | N,N-di-β-hydroxyethyl-m-toluidine | Violet. |
| Do | N-β-hydroxyethyl-N-β-methoxyethylaniline | Red-violet. |
| Do | N-β-cyanoethyl-N-hydroxyethylaniline | Red. |
| Do | N-β-cyanoethyl-N-ethyl-m-toluidine | Red-violet. |
| Do | N-β-methyl-2,3-dihydroxypropylaniline | Do. |
| Do | N-β-hydroxyethyl-N-β-difluoroethyl-m-toluidine | Red. |
| 2-(2',4'-dinitrophenyl)-3-amino-4-cyanopyrazole | N-ethyl-N-β-hydroxyethylaniline | Blue-violet. |
| Do | N-ethyl-N-β-cyanoethylaniline | Violet. |
| Do | N-β-acetoxyethyl-N-β-cyanoethylaniline | Do. |
| Do | N,N-di-β-hydroxyethyl-m-toluidine | Blue-violet. |
| 2-(4'-chlorophenyl)-3-amino-4-cyanopyrazole | N-ethyl-N-β-hydroxyethylaniline | Red. |
| Do | N-ethyl-N-β-cyanoethylaniline | Orange-red. |
| Do | N-β-acetoxyethyl-N-β-cyanoethylaniline | Do. |
| Do | N-γ-acetoxypropyl-N-β-cyanoethylaniline | Do. |
| 2-(2',5'-dichlorophenyl)-3-amino-4-cyanopyrazole | N-ethyl-N-β-hydroxyethylaniline | Red. |
| Do | N-ethyl-N-β-cyanoethylaniline | Orange-red. |
| Do | N-β-acetoxyethyl-N-β-cyanoethylaniline | Do. |
| Do | N-δ-acetoxybutyl-N-β-cyanoethylaniline | Do. |
| 2-methyl-3-amino-4-cyanopyrazole | N-ethyl-N-β-hydroxyethylaniline | Do. |
| Do | N-ethyl-N-β-cyanoethylaniline | Orange. |
| Do | N-β-acetoxyethyl-N-β-cyanoethylaniline | Do. |
| Do | N—CH₂CH₂O$\overset{\text{O}}{\overset{\|}{\text{C}}}$NC₂H₅—N—ethylaniline (with H on N) | Do. |
| 2-ethyl-3-amino-4-cyanopyrazole | N-ethyl-N-β-hydroxyethylaniline | Orange-red. |
| Do | N-ethyl-N-β-cyanoethylaniline | Orange. |
| Do | N-β-acetoxyethyl-N-β-cyanoethylaniline | Do. |
| Do | N—CH₂CH₂O$\overset{\text{S}}{\overset{\|}{\text{C}}}$NC₂H₅—N—ethylaniline (with H on N) | Do. |
| 2-n-propyl-3-amino-4-cyanopyrazole | N-ethyl-N-β-hydroxyethylaniline | Red- |
| Do | N-ethyl-N-β-cyanoethylaniline | Orange-red. |
| Do | N-β-acetoxyethyl-N-β-cyanoethylaniline | Do. |
| 2-n-butyl-3-amino-4-cyanopyrazole | N-ethyl-N-β-hydroxyethylaniline | Red. |
| Do | N-ethyl-N-β-cyanoethylaniline | Orange-red. |
| Do | N-β-acetoxyethyl-N-β-cyanoethylaniline | Do. |

While numerous examples of the compounds of our invention have been given, these examples are illustrative and not limitative. Any of the 3-amino-4-cyanopyrazole compounds can be diazotized and coupled with an aniline coupling component devoid of a sulfonic acid group to obtain compounds of our invention.

The following examples illustrate the preparation of compounds of Formulas III and IV above.

EXAMPLE 12

Coupling

One-fourth of the diazonium solution prepared from 3-amino-4-cyanopyrazole as described in 5A was added, with stirring, to a solution of 0.59 part of N-β,γ-dihydroxypropyl-2,7-dimethyltetrahydroquinoline in 6.3 parts of the propionic-acetic acid mixture (prepared as in 5A)

cooled to 0° C. The rate of addition of the diazonium solution was such that the temperature of the reaction mixture remained at 0° C.–5° C. When the addition was complete the reaction mixture was made neutral to Congo Red Paper by the addition of sodium acetate. The neutralized coupling mixture was allowed to stand in a melting ice bath for one hour, with occasional stirring, and then was diluted with 250 parts of cold water, with good stirring. The dye compound which precipitated was recovered by filtration, washed with water until neutral and air-dried. 0.68 part (76.4%) of the dye compound having the formula

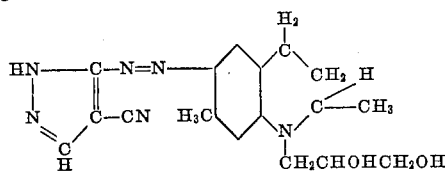

was thus obtained. It dyes cellulose acetate, nylon and polyester fabrics bright reddish-orange shades and acrylonitrile polymer fabrics duller orange shades.

EXAMPLE 13

A solution of 0.52 part of N-β-hydroxyethyl-2,7-dimethylbenzomorpholine in 6.3 parts of the propionic-acetic acid mixture prepared as described in Example 5A was coupled with one-fourth of the 3-amino-4-cyanopyrazole diazonium solution obtained as described in Example 5A. Coupling and recovery of the dye compound formed were carried out in accordance with the procedure described in Example 12. The dye compound obtained has the formula:

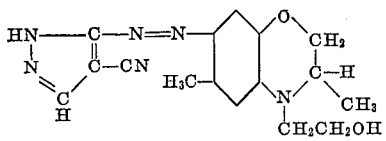

It dyes cellulose acetate, nylon, polyester and acrylonitrile polymer fabrics reddish-orange shades.

EXAMPLE 14

1.84 parts of 2-phenyl-3-amino-4-cyanopyrazole were diazotized and the diazonium compound obtained was coupled with 2.37 parts of N-β,γ-dihydroxypropyl-2,5-dimethylbenzomorpholine. Diazotization coupling and recovery of the dye compound formed were carried out in accordance with the general procedure described in Example 12. The dye compound obtained dyes cellulose acetate, nylon, polyester and acrylonitrile polymer fabrics pinkish-violet shades.

EXAMPLE 15

2.29 parts of 2-(4'-nitrophenyl)-3 - amino - 4 - cyanopyrazole were diazotized and the diazonium compound obtained was coupled with 1.91 parts of N-β-hydroxyethyl - 7 - methyltetrahydroquinoline. Diazotization, coupling and recovery of the dye compound formed were carried out in accordance with the general procedure described in Example 12. The dye compound obtained dyes cellulose acetate, nylon, polyester and acrylonitrile polymer fabrics bluish-violet.

EXAMPLE 16

1.22 parts of 2-methyl-3-amino-4-cyanopyrazole were diazotized and the diazonium compound obtained was coupled with 2.35 parts of N-n-butyl-2,2,4-trimethyltetrahydroquinoline. Diazotization, coupling and recovery of the dye compound formed were carried out in accordance with the general procedure described in Example 12. The dye compound obtained dyes cellulose acetate, nylon, polyester and acrylonitrile polymer fabrics reddish-orange.

EXAMPLE 17

2.74 parts of 2-(2',4'-dinitrophenyl)-3-amino-4-cyanopyrazole were diazotized and the diazonium compound obtained was coupled with 1.86 parts of N-β-cyanoethyltetrahydroquinoline. Diazotization, coupling and recovery of the dye compound formed were carried out in accordance with the general procedure described in Example 12. The dye compound obtained dyes cellulose acetate, nylon, polyester and acrylonitrile polymer fabrics reddish-blue.

EXAMPLE 18

2.29 parts of 2-(4'-chlorophenyl)-3-amino - 4 - cyanopyrazole were diazotized and the diazonium compound obtained was coupled with 1.88 parts of N-β-cyanoethylbenzomorpholine. Diazotization, coupling and recovery of the dye compound formed were carried out in accordance with the general procedure described in Example 12. The dye compound obtained dyes cellulose acetate, nylon, polyester and acrylonitrile polymer fabrics pinkish violet.

EXAMPLE 19

2.53 parts of 2-(2',5'-dichlorophenyl)-3-amino-4-cyanopyrazole were diazotized and the diazonium compound obtained was coupled with 2.07 parts of N-β,γ-dihydroxypropyltetrahydroquinoline. Diazotization, coupling and recovery of the dye compound obtained were carried out in accordance with the general procedure described in Example 12. The dye compound obtained dyes cellulose acetate, nylon, polyester and acrylonitrile polymer fabrics pinkish-violet.

EXAMPLE 20

1.22 parts of 2-methyl-3-amino-4-cyanopyrazole were diazotized and the diazonium compound obtained was coupled with 2.09 parts of N-β,γ-dihydroxypropylbenzomorpholine. Diazotization, coupling and recovery of the dye compound obtained were carried out in accordance with the general procedure described in Example 12. The dye compound obtained dyes cellulose acetate, nylon, polyester and acrylonitrile polymer fabrics reddish-orange.

EXAMPLE 21

1.36 parts of 2-ethyl-3-amino-4-cyanopyrazole were diazotized and the diazonium compound obtained was coupled with 1.91 parts of N-β-methoxyethyltetrahydroquinoline. Diazotization, coupling and recovery of the dye compound obtained were carried out in accordance with the general procedure described in Example 12. The dye compound obtained dyes cellulose acetate, nylon, polyester and acrylonitrile polymer fabrics reddish orange.

EXAMPLE 22

1.50 parts of 2-n-propyl-3-amino-4-cyanopyrazole were diazotized and the diazonium compound obtained was coupled with 1.91 parts of N-β-hydroxypropyltetrahydroquinoline. Diazotization, coupling and recovery of the dye compound obtained were carried out in accordance with the general procedure described in Example 12. The dye compound obtained dyes cellulose acetate, nylon, polyester and acrylonitrile polymer fabrics reddish-orange.

EXAMPLE 23

1.64 parts of 2-n-butyl-3-amino-4-cyanopyrazole were diazotized and the diazonium compound obtained was coupled with 2.05 parts of N-δ-hydroxybutyltetrahydroquinoline. Diazotization, coupling and recovery of the dye compound obtained were carried out in accordance with the general procedure described in Example 12. The dye compound obtained dyes cellulose acetate, nylon, polyester and acrylonitrile polymer fabrics reddish-orange.

The following tabulation further illustrates the new monoazo compounds of our invention together with the color they produce on cellulose acetate textile materials. The azo compounds indicated hereinafter are prepared by diazotizing the pyrazole compounds listed under the heading "Pyrazole Compound" and coupling the respective diazonium compounds obtained with the coupling components specified in the column entitled "Coupling Component." Diazotization, coupling and recovery of the azo dye compound formed are carried out in accordance with the general procedure disclosed in Examples 12 to 23, inclusive.

| Pyrazole Compound | Coupling Component | Color |
|---|---|---|
| 3-amino-4-cyanopyrazole | Tetrahydroquinoline | Orange. |
| Do | N-ethyltetrahydroquinoline | Reddish-orange. |
| Do | N-n-butyltetrahydroquinoline | Do. |
| Do | N-β-hydroxyethyltetrahydroquinoline | Do. |
| Do | N-β,γ-dihydroxypropyltetrahydroquinoline | Do. |
| Do | N-β,methyl-β,γ-dihydroxypropyltetrahydroquinoline | Do. |
| Do | N-γ-hydroxypropyltetrahydroquinoline | Do. |
| Do | N-δ-hydroxybutyltetrahydroquinoline | Do. |
| Do | N-β,γ-dihydroxypropyl-5-chlorotetrahydroquinoline | Yellowish-orange. |
| Do | N-β,γ-dihydroxypropyl-7-chlorotetrahydroquinoline | Do. |
| Do | N-β,γ-dihydroxypropyl-7-methoxytetrahydroquinoline | Reddish-orange. |
| Do | N-β-methoxyethyltetrahydroquinoline | Do. |
| Do | N-β-cyanoethyltetrahydroquinoline | Orange. |
| Do | N-β-cyanoethyl-2,7-dimethyltetrahydroquinoline | Do. |
| Do | N-γ-cyanopropyltetrahydroquinoline | Do. |
| Do | N-β-carbomethoxyethyltetrahydroquinoline | Do. |
| Do | N-β,β,β-trifluoroethyltetrahydroquinoline | Do. |
| Do | N-β,β-difluoroethyltetrahydroquinoline | Do. |
| Do | N-allyltetrahydroquinoline | Reddish-orange. |
| Do | 7-acetylaminotetrahydroquinoline | Pinkish-orange. |
| Do | N-β,γ-dihydroxypropyl-5-acetylaminotetrahydroquinoline | Do. |
| Do | N-β-hydroxyethyl-2,2,4-trimethyltetrahydroquinoline | Reddish-orange. |
| Do | Benzomorpholine | Orange. |
| Do | N-ethylbenzomorpholine | Reddish-orange. |
| Do | N-n-butylbenzomorpholine | Do. |
| Do | N-β-hydroxyethylbenzomorpholine | Do. |
| Do | N-β,γ-dihydroxypropylbenzomorpholine | Do. |
| Do | N-β-methyl-β,γ-dihydroxypropylbenzomorpholine | Do. |
| Do | N-γ-hydroxypropylbenzomorpholine | Do. |
| Do | N-δ-hydroxybutylbenzomorpholine | Do. |
| Do | N-β,γ-dihydroxypropyl-5-chlorobenzomorpholine | Orange. |
| Do | N-β,γ-dihydroxypropyl-7-chlorobenzomorpholine | Do. |
| Do | N-β,γ-dihydroxypropyl-7-methoxybenzomorpholine | Reddish-orange. |
| Do | N-β-methoxyethylbenzomorpholine | Do. |
| Do | N-β-cyanoethylbenzomorpholine | Orange. |
| Do | N-β-cyanoethyl-2,7-dimethylbenzomorpholine | Do. |
| Do | N-γ-cyanopropylbenzomorpholine | Do. |
| Do | N-β-carbomethoxyethylbenzomorpholine | Do. |
| Do | N-β,β,β-trifluoroethylbenzomorpholine | Do. |
| Do | N-β,β-difluoroethylbenzomorpholine | Do. |
| Do | N-allylbenzomorpholine | Reddish-orange. |
| Do | 7-acetylaminobenzomorpholine | Pinkish-orange. |
| Do | N-β,γ-dihydroxypropyl-5-acetylaminobenzomorpholine | Do. |
| 2-phenyl-3-amino-4-cyanopyrazole | N-n-propyltetrahydroquinoline | Pinkish-violet. |
| Do | N-β,γ-dihydroxypropyl-7-formyltetrahydroquinoline | Do. |
| Do | N-β,γ-dihydroxypropyl-2,5-dimethyltetrahydroquinoline | Do. |
| Do | N-β-hydroxyethyl-7-fluorotetrahydroquinoline | Orange-pink. |
| Do | N-β-ethoxyethyltetrahydroquinoline | Pinkish-violet. |
| Do | N-δ-cyanobutyltetrahydroquinoline | Do. |
| Do | N-γ,γ,γ-trifluoropropyltetrahydroquinoline | Orange-pink. |
| Do | N-γ,γ-difluoropropyltetrahydroquinoline | Do. |
| Do | N-β-chloroethyltetrahydroquinoline | Do. |
| Do | 3-methoxy-7-acetylaminotetrahydroquinoline | Violet. |
| Do | 7-chlorotetrahydroquinoline | Orange-pink. |
| Do | 8-methoxytetrahydroquinoline | Pinkish-violet. |
| Do | N-n-propylbenzomorpholine | Do. |
| Do | N-β,γ-dihydroxypropyl-2,5-dimethylbenzomorpholine | Do. |
| Do | N-β-hydroxyethyl-7-fluorobenzomorpholine | Orange-pink. |
| Do | N-β-ethoxyethylbenzomorpholine | Pinkish-violet. |
| Do | N-δ-cyanobutylbenzomorpholine | Orange-pink. |
| Do | N-γ,γ,γ-trifluoropropylbenzomorpholine | Do. |
| Do | N-γ,γ-difluoropropylbenzomorpholine | Do. |
| Do | N-β-chloroethylbenzomorpholine | Do. |
| Do | 3-methoxy-7-acetylaminobenzomorpholine | Violet. |
| Do | 7-chlorobenzomorpholine | Orange-pink. |
| 2-(2',4'-dinitrophenyl)-3-amino-4-cyanopyrazole | N-isopropyltetrahydroquinoline | Reddish-blue. |
| Do | N-β,γ-dihydroxypropyl-2,7-dimethyltetrahydroquinoline | Do. |
| Do | N-β-hydroxyethyl-2-methyltetrahydroquinoline | Do. |
| Do | N-β,γ-dihydroxypropyl-7-bromotetrahydroquinoline | Violet. |
| Do | N-β,γ-dihydroxypropyl-2-methyl-8-methoxytetrahydroquinoline | Reddish-blue. |
| Do | N-isopropylbenzomorpholine | Do. |
| Do | N-β,γ-dihydroxypropyl-2,7-dimethylbenzomorpholine | Do. |
| Do | N-β-hydroxyethyl-2-methylbenzomorpholine | Do. |
| Do | N-β,γ-dihydroxypropyl-7-bromobenzomorpholine | Violet. |
| 2-(4'-chlorophenyl)-3-amino-4-cyanopyrazole | N-methyltetrahydroquinoline | Pinkish-violet. |
| Do | N-β-hydroxyethyl-2,7-dimethyltetrahydroquinoline | Do. |
| Do | N-β,γ-dihyroxypropyl-2-methyltetrahydroquinoline | Do. |
| Do | 3-methyoxy-5-formylaminotetrahydroquinoline | Violet. |
| Do | N-methylbenzomorpholine | Pinkish-violet. |
| Do | N-β-hydroxyethyl-2,7-dimethylbenzomorpholine | Do. |
| Do | N-β,γ-dihydroxypropyl-2-methylbenzomorpholine | Do. |
| Do | N-β,γ-dihyroxypropyl-2,5,7-trimethylbenzomorpholine | Do. |
| 2-ethyl-3-amino-4-cyanopyrazole | N-β-methoxyethyl-2-methyltetrahydroquinoline | Reddish-orange. |
| Do | N-β-ethoxyethyl-2,7-dimethyltetrahydroquinoline | Do. |
| Do | N-β-carboethoxyethyltetrahydroquinoline | Orange. |
| Do | N-β-hydroxy-γ-chloropropyltetrahydroquinoline | Reddish-orange. |
| Do | N-β-methoxyethyl-2-methylbenzomorpholine | Do. |
| Do | N-β-ethoxyethyl-2,7-dimethylbenzomorpholine | Do. |
| Do | N-β-carboethoxyethylbenzomorpholine | Orange. |
| Do | N-β-hydroxy-γ-chloropropylbenzomorpholine | Reddish-orange. |
| 2-n-propyl-3-amino-4-cyanopyrazole | N-β-ethoxyethyl-7-methoxytetrahydroquinoline | Do. |
| Do | N-β-hydroxypropyl-2,7-dimethyltetrahydroquinoline | Do. |
| Do | N-n-butyl-3-hydroxy-7-methyltetrahydroquinoline | Do. |
| Do | N-β,γ-dihydroxypropyl-7-fluoroetetrahydroquinoline | Orange. |
| Do | N-β-ethoxyethyl-7-methoxybenzomorpholine | Reddish-orange. |
| Do | N-β-hydroxypropyl-2,7-dimethylbenzomorpholine | Do. |
| Do | N-β,γ-dihydroxypropyl-2-methyl-5-chlorobenzomorpholine | Orange. |
| Do | N-β-cyanoethyl-7-propionylaminobenzomorpholine | Pinkish-orange. |
| 2-n-butyl-3-amino-4-cyanopyrazole | N-allyl-7-acetylaminotetrahydroquinoline | Do. |
| Do | N-β,γ-dihydroxypropyl-5-propionylaminotetrahydroquinoline | Do. |

| Pyrazole Compound | Coupling Component | Color |
|---|---|---|
| 2-n-butyl-3-amino-4-cyanopyrazole | N-β-hydroxy-γ-chloropropyl-7-methyltetrahydroquinoline | Reddish-orange. |
| Do | N-β-cyanoethyl-2-methyl-7-chlorotetrahydroquinoline | Orange. |
| Do | N-β-hydroxyethyl-2,5-dimethylbenzomorpholine | Reddish-orange. |
| Do | N-n-butyl-2,5-dimethylbenzomorpholine | Do. |
| Do | N-β-cyanoethyl-2-methyl-5-chlorobenzomorpholine | Orange. |
| Do | N-β,γ-dihydroxypropyl-7-acetylaminobenzomorpholine | Pinkish-orange. |
| Do | N-β-methoxyethyl-2-methyl-7-chlorobenzomorpholine | Orange. |
| 2-(2',5'-dichlorophenyl)-3-amino-4-cyanopyrazole | N-β,γ-dihydroxypropyl-7-methyltetrahydroquinoline | Pinkish-violet. |
| Do | N-β,γ-dihydroxypropyl-7-fluorotetrahydroquinoline | Pinkish-orange. |
| Do | N-β-hydroxyethyl-7-methyltetrahydroquinoline | Pinkish-violet. |
| Do | N-δ,δ,δ-trifluorobutyltetrahydroquinoline | Do. |
| Do | N-β,γ-dihydroxypropyl-7-butyrylaminotetrahydroquinoline | Violet. |
| Do | N-β,γ-dihydroxypropyl-7-methylbenzomorpholine | Pinkish-violet. |
| Do | N-β,γ-dihydroxypropyl-7-fluorobenzomorpholine | Pinkish-orange. |
| Do | N-β-hydroxyethyl-7-methylbenzomorpholine | Pinkish-violet. |
| Do | N-δ,δ,δ-trifluorobutylbenzomorpholine | Do. |
| Do | N-β,γ-dihydroxypropyl-7-butytylaminobenzomorpholine | Violet. |
| 2-methyl-3-amino-4-cyanopyrazole | N-β-hydroxyethyl-7-ethyltetrahydroquinoline | Reddish-orange. |
| Do | N-β-hydroxyethyl-7-methoxytetrahydroquinoline | Do. |
| Do | N-β,γ-dihydroxypropyl-7-ethoxytetrahydroquinoline | Do. |
| Do | N-δ,δ-difluorobutyltetrahydroquinoline | Do. |
| Do | 2,2,4-trimethyltetrahydroquinoline | Orange. |
| Do | N-β-hydroxyethyl-7-ethylbenzomorpholine | Reddish-orange. |
| Do | N-β-hydroxyethyl-7-methoxybenzomorpholine | Do. |
| Do | N-β,γ-dihydroxypropyl-7-ethoxybenzomorpholine | Do. |
| Do | N-δ,δ-difluorobutylbenzomorpholine | Do. |
| Do | N-β-cyanoethyl-5-acetylaminobenzomorpholine | Do. |

Other tetrahydroquinoline and benzomorpholine compounds that can be used to prepare the azo compounds of our invention, include, for example, N-β-hydroxyethyl-5-butyrylaminotetrahydroquinoline,
N-β,γ-dihydroxypropyl-7-acetylaminotetrahydroquinoline,
N-β,γ-dihydroxypropyl-7-propionylaminotetrahydroquinoline,
N-β,γ-dihydroxypropyl-2,2,4-trimethyl-8-chloroeterahydroquinoline,
N-β-hydroxypropyl-2-methyl-7-bromoeterahydroquinoline,
N-β,γ-dihydroxypropyl-2-methyl-7-bromotetrahydroquinoline,
N-β,γ-dihydroxypropyl-2-methyl-7-chlorotetrahydroquinoline,
N-β-hydroxyethyl-5-chlorotetrahydroquinoline,
N-β,γ-dihydroxypropyl-5-chlorotetrahydroquinoline,
N-β-cyanoethyl-5-chlorotetrahydroquinoline,
N-β-hydroxyethyl-5-bromotetrahydroquinoline,
N-β-cyanoethyl-5-bromotetrahydroquinoline,
N-β-hydroxyethyl-5-fluorotetrahydroquinoline,
N-β,γ-dihydroxypropyl-5-fluorotetrahydroquinoline,
N-β-cyanoethyl-2,7-dimethylbenzomorpholine,
N-β-hydroxypropylbenzomorpholine,
N-β,γ-dihydroxypropyl-2,5-dimethylbenzomorpholine,
N-β-cyanoethyl-2,5-dimethylbenzomorpholine,
N-ethyl-2,5-dimethylbenzomorpholine,
N-β-cyanoethyl-2,5,7-trimethylbenzomorpholine,
N-β-cyanoethyl-7-methoxybenzomorpholine,
N-β,y-dihydroxypropyl-5-methylbenzomorpholine,
N-β,γ-dihydroxypropyl-2-methyl-7-chlorobenzomorpholine,
N-β,γ-dihydroxypropyl-2-methyl-7-bromobenzomorpholine,
N-β,γ-dihydroxypropyl-2-methyl-5-bromobenzomorpholine,
N-β-methyl-β,γ-dihydroxypropyl-2-methyl-benzomorpholine,
N-β-hydroxyethyl-7-acetylaminobenzomorpholine,
N-β-cyanoethyl-7-butyrylaminobenzomorpholine,
N-n-butyl-2,7-dimethylbenzomorpholine, and
N-β-ethoxyethyl-2,7-dimethylbenzomorpholine.

Inasmuch as coupling occurs in the 6-position of the tetrahydroquinoline and benzomorpholine nucleus this position must be unsubstituted.

As previously indicated the new monoazo compounds of our invention are dyes for cellulose alkyl carboxylic acid ester, having 2 to 4 carbon atoms in the acid groups thereof, nylon, polyester and acrylonitrile polymer textile materials. These materials can be dyed using known methods for dyeing these materials. Thus our new monoazo dyestuffs can be directly applied to said materials in the form of an aqueous suspension which can be prepared by finely grinding them to a paste in the presence of a sulfonated oil, sodium lignin sulfonate, or other suitable dispersing agent and dispersing the resulting paste in water. In the case of polyester textile materials, such as linear aromatic polyesters having a melting point of at least 200° C., a dyeing assistant ordinarily referred to as a "carrier" may be used in the dyeing operation. Butyl benzoate, o-phenylphenol, p-phenylphenol, salicyclic acid, methyl salicylate and benzoic acid are illustrative of the carriers that can be employed.

Polyester textile materials can be dyed by the methods described in U.S. Patents 2,757,064 and 2,880,050, for example.

The following example illustrates one satisfactory way in which our new monoazo dyestuffs can be used to dye an acrylonitrile polymer textile material. .1 gram of dye is dissolved by warming in 5 cc. of methyl Cellosolve. A 2% aqueous solution of a nonionic surfactant, such as Igepal CA (a polymerized ethylene oxide-alkylphenol condensation product), is added slowly until a fine emulsion is obtained and then the dye mixture is brought to a volume of 200 cc. with warm water. 5 cc. of a 5% aqueous solution of formic acid or acetic acid are added and then 10 grams of fabric made from an acrylic fiber is entered and in the case of Orlon 42 the dyeing is carried out at the boil for one hour. In the case of materials made of Verel acrylic fiber the dyebath temperature should not exceed 90° C. in order to avoid damage to the fiber. The dyed material is then washed well with hot water and dried.

The foregoing dyeing example is merely illustrative of the manner in which the new monoazo dyestuffs of our invention can be applied to acrylonitrile polymer textile materials. Larger or smaller amounts of the dyestuffs can be employed, for example. Similarly, dyeing assistants other than Igepal CA can be employed.

Nylon and said cellulose alkyl carboxylic acid ester textile materials can be dyed, for example, by the procedure described in U.S. Patent 2,785,157.

The textile material can be in any desired form such as fiber, filament, yarn or cloth form, for example.

The invention has been described in detail with particular reference to preferred embodiments thereof, but it will be understood that variations and modifications can be effected with the spirit and scope of the invention as described hereinabove and as defined in the appended claims.

What we claim is:
1. An azo compound having the formula

$$X-N\underset{\underset{H}{\overset{\|}{C}}}{\overset{\displaystyle\diagup}{\underset{\displaystyle N}{\diagdown}}}\overset{C-N=N-R}{\underset{C-CN}{}}$$

wherein

X represents hydrogen, lower alkyl, phenyl, or phenyl substituted with lower alkyl, lower alkoxy, nitro, or halogen; and R represents (1) the residue of an aniline coupling component having the formula (structure with Y, Q, $R_1$, $R_2$ substituents on benzene ring)

wherein $R_1$ and $R_2$ each represents alkyl having 1 to 4 carbon atoms, hydroxyalkyl having 2 to 4 carbon atoms, alkoxyalkyl having 3 to 4 carbon atoms, cyanoalkyl having 3 to 5 carbon atoms, acetoxyalkyl having 4 to 6 carbons atoms, carbomethoxymethyl, carboethoxymethyl, β-carbomethoxyethyl, β-carboethoxyethyl, haloalkyl having 2 to 4 carbon atoms, N-phenyl - β - carbamoyloxyethyl, N-phenyl-β-thiocarbamoyloxyethyl, N-lower alkyl-β-carbamoyloxyethyl, N-lower alkyl-β-thiocarbamoyloxyethyl, alkenyl having 3 to 4 carbon atoms, chloroalkenyl having 3 to 4 carbon atoms, bromoalkenyl having 3 to 4 carbon atoms, or 2,3-epoxypropyl;

Q represents hydrogen, bromine, chlorine, methyl, ethyl, methoxy, ethoxy, acetylamino, n-propionylamino, or n-butyrylamino; and Y represents hydrogen, methyl, ethyl, methoxy, ethoxy, chlorine, or bromine;

(2) the residue of a tetrahydroquinoline coupling component having the formula (structure with $Q_1$, $Q_2$, $Q_3$, $Q_4$, $Q_5$, $R_3$ substituents)

wherein $R_3$ represents alkyl having 1 to 4 carbon atoms, hydroxyalkyl having 2 to 4 carbon atoms, alkoxyalkyl having 3 to 4 carbon atoms, cyanoalkyl having 3 to 5 carbon atoms, haloalkyl having 2 to 4 carbon atoms, β - chloro - gamma-hydroxypropyl, β-carbomethoxyethyl, β-carboethoxyethyl, or allyl;

$Q_1$, $Q_2$, or $Q_3$ each represents hydrogen, methyl or ethyl; and $Q_4$ and $Q_5$ each represent hydrogen, methyl, ethyl, methoxy, ethoxy, chlorine, bromine, fluorine, acetylamino, propionylamino, or butyrylamino; or (3) the residue of a benzomorpholine coupling component having the formula (structure with $Q_1$, $Q_2$, $Q_4$, $Q_5$, $R_3$ substituents)

wherein $R_3$ represents alkyl having 1 to 4 carbon atoms, hydroxyalkyl having 2 to 4 carbon atoms, alkoxyalkyl having 3 to 4 carbon atoms, cyanoalkyl having 3 to 5 carbon atoms, haloalkyl having 2 to 4 carbon atoms, β - chloro-gamma - hydroxypropyl, β-carbomethoxyethyl, β-carboethoxyethyl, or allyl;

$Q_1$ and $Q_2$ each represents hydrogen, methyl, or ethyl; and $Q_4$ and $Q_5$ each represents hydrogen, methyl, ethyl, methoxy, ethoxy, chlorine, bromine, fluorine, acetylamino, propionylamino, or butyrylamino.

2. The azo compound having the formula:

(structure shown)

3. The azo compound having the formula:

(structure shown)

4. The azo compound having the formula:

(structure shown)

5. The azo compound having the formula:

(structure shown)

6. The azo compound having the formula:

(structure shown)

7. The azo compound having the formula:

(structure shown)

8. The azo compound having the formula:

(structure shown)

9. The azo compound having the formula:

(structure shown)

10. The azo compound having the formula:

(structure shown)

11. The azo compound having the formula:
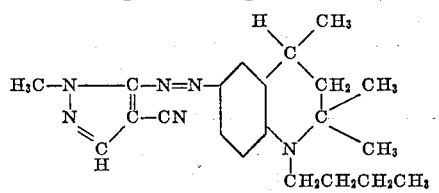
No references cited.
CHARLES B. PARKER, *Primary Examiner.*
D. PAPUGA, *Assistant Examiner.*